United States Patent [19]

Cecil

[11] 4,151,394
[45] Apr. 24, 1979

[54] GUIDANCE SYSTEM FOR ARC WELDER

[75] Inventor: Shelby Cecil, Cleveland, Ohio

[73] Assignee: The Cecil Equipment Co., Medina, Ohio

[21] Appl. No.: 874,153

[22] Filed: Nov. 5, 1979

[51] Int. Cl.² .................................................. B23K 9/12
[52] U.S. Cl. ................................. 219/124.34; 228/45
[58] Field of Search ................................. 219/124–126, 219/125 PL, 60, 60.1, 124.34; 228/45

[56] References Cited

U.S. PATENT DOCUMENTS

| | | | |
|---|---|---|---|
| 2,839,663 | 6/1958 | McCollam | 219/125 X |
| 3,072,779 | 1/1963 | Masters et al. | 219/125 |
| 3,171,012 | 2/1965 | Morehead | 219/124 |
| 3,408,475 | 10/1968 | Fier | 219/125 |

*Primary Examiner*—J. V. Truhe
*Assistant Examiner*—Clifford C. Shaw
*Attorney, Agent, or Firm*—Fleischner, Schutz and Henn

[57] ABSTRACT

This guidance system for an automatic welder includes a probe, sensing means in the probe, feedback means from the probe to actuating means and appropriate motors and switches to cause the welding unit to move in response to signals from the probe.

The probe has a casing with a concentric actuating rod. The actuating rod is supported in the casing by means of a pivot plate which is movably mounted on a fixed plate. A probe finger is attached to the lower end of the actuating rod. The upper end of the actuating rod passes through a series of switches. The switches sense movement of a pivotably mounted actuating rod in a horizontal and vertical plane. The switches themselves are paired and are mounted along planes which are perpendicular to each other.

The probe is mounted at a 45 degree angle. Additional switches provide a means for biasing the probe for movement in a given direction without receiving any external signal. An optional switching system may also be used for two speed travel of the entire unit.

Control relay coils are actuated by signals through the switches within the probe and move control relay switches. Motors respond to the control relay switches and move the guidance and welding systems until new information is received from the probe.

Dynamic braking is used to stop the motors without any substantial coasting once the actuating signal stops.

4 Claims, 18 Drawing Figures

INVENTOR.
SHELBY CECIL
BY
Fay, Sharpe & Mulholland
ATTORNEYS

INVENTOR.
SHELBY CECIL
BY
Fay, Sharpe & Mulholland
ATTORNEYS

GUIDANCE SYSTEM FOR ARC WELDER

BACKGROUND OF THE INVENTION

In many industrial environments arc welders are used to weld a seam between two workpieces of relatively large size. Preferably a guidance system is used in conjunction with the arc welder in order to reduce the manpower necessary and the time required to make the weld.

Ideally, the guidance system should be able to seek the seam in a workpiece, proceed to it quickly and accurately and start to weld. Lapped joints should be able to be welded by the arc welder by using the guidance system, that is, the guidance system should be able to maintain the head of the arc welder in relation to a given side of a joint.

Various guidance systems have been devised in order to automate arc welding. One known guidance system is the Automatic Groove Follower For Welding Apparatus in the Morehead U.S. Pat. No. 3,171,012. That patent discloses a welding head for depositing flux in a groove and means for moving the work and the welding head relative to each other in a direction generally lengthwise with respect to the groove. Motors are used for the horizontal and vertical movement of the welder.

The probe assembly is mounted in front of the welding head and includes an elongated feeler which is pivotally mounted in order that it may open and close various electrical contacts in accordance with the direction in which the feeler is deflected. An appropriate circuit is associated with the contacts to align the welding head with respect to the groove sensed by the elongated feeler.

There are two significant deficiencies in the Morehead apparatus. The elongated feeler is not capable of making horizontal adjustments unless there are two sides to the seam; that is, the elongated feeler must have a path in which it may travel in order to actuate the contacts which move the head of the arc welder in an appropriate direction. This is particularly a problem where there is a lap joint. By lap joint it is meant that one of the workpieces overlaps another workpiece. In this situation it is desirable to lay a bead or seam at the connecting line. However, in the guidance system of Morehead, the feeler would sense the upper workpiece and a signal would be sent to the horizontal motor to move the probe and the arc head away from the actual point where the weld is desired.

A similar problem is encountered where there is a deep groove and overlapping beads are required. The initial seam would work with the Morehead device. A subsequent seam, however, would be erratic due to the fact that the probe would sense both of the sides of the groove and the initial bead, and literally bounce back and forth.

Needless to say, it would be highly desirable to be able to program the probe so that it would abut against one side of the groove in order to signal the arc welder to lay its seam along the precise line desired.

It is also highly desirable if the accompanying circuitry for the guidance system has dynamic braking to prohibit the motors from coasting to a stop and thereby having the probe and arc welder overshoot its target. That is, it is desirable to bring the arc head to its position as quickly as possible and stop it there in order to maintain the necessary accuracy. Multiple speeds for the movement of the probe and welding head are also desirable to improve the efficiency of the operation. In this area the Morehead device is also deficient.

The present invention has the desirable aspects noted above. It provides a probe and accompanying circuitry which can be programmed to move along the edge of an abutment such as a lap joint. That is, the probe is "preloaded" so that it will seek an edge or abutment and once it has reached it, maintain a constant contact with it so that the arc head will lay the bead along the seam. This invention also provides for two-speed step control in bringing the arc head to its desired position and dynamic braking of the motors for precise corrections.

SUMMARY OF THE INVENTION

This invention relates to a guidance system for an electric arc welder. It includes a probe mounted near the welder and has an actuating rod supported in a casing. A probe finger is attached to one end of the actuating rod and extends beyond it. Switching means for sensing movement of the actuating rod are in planes substantially perpendicular to the axis of the actuating rod and transmits signals to the guidance circuitry. Appropriate selection and positioning of switches provide a means for having the probe finger sense one edge of a lap joint and lay the seam along it. Circuit means are associated with the probe for energizing motors to move and head of the arc welder in a horizontal and vertical direction.

Figure 2:
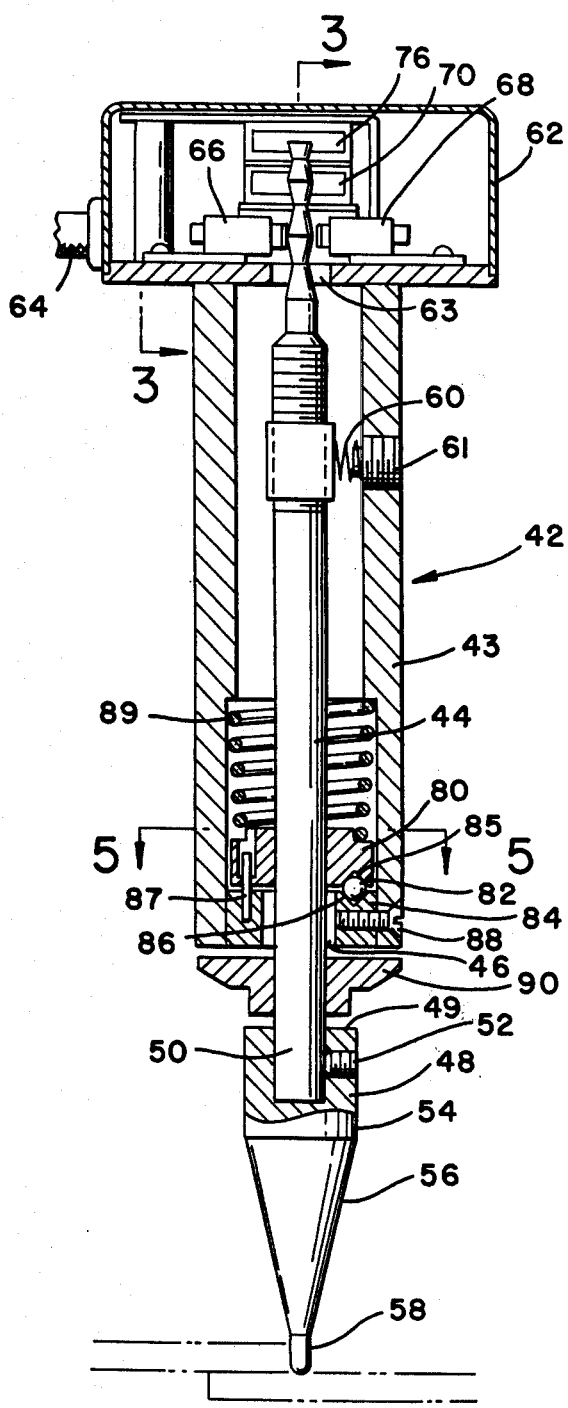
FIG. 2 is a side cross-sectional view of the probe of this invention.
Figure 3:
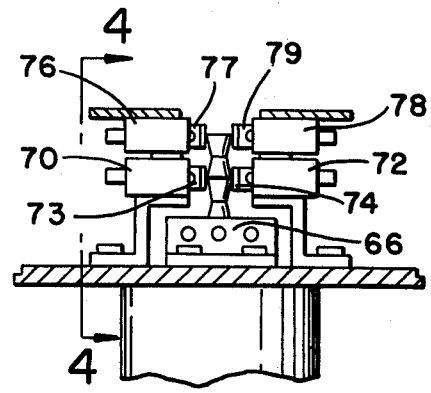

FIG. 3 of the section taken through 3—3 is FIG. 2 and shows the contacts interacting with the actuating rod and the probe.

Figure 4:
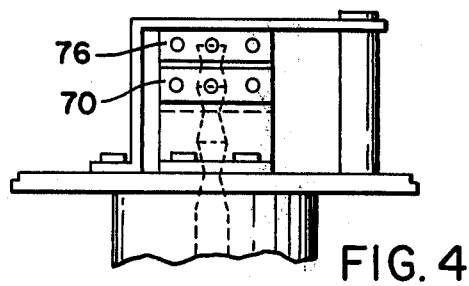

FIG. 4 is a section 4—4 of FIG. 3 showing the electrical contacts which are sensitive to horizontal motion of the probe.

Figure 5:
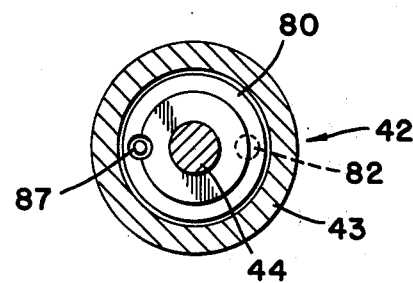

FIG. 5 is a section taken through 5—5 of FIG. 3 and is a top view of the lower section of the probe.

FIGS. 6–13 illustrate various types of workpieces which may be welded with this invention.

Figure 14:
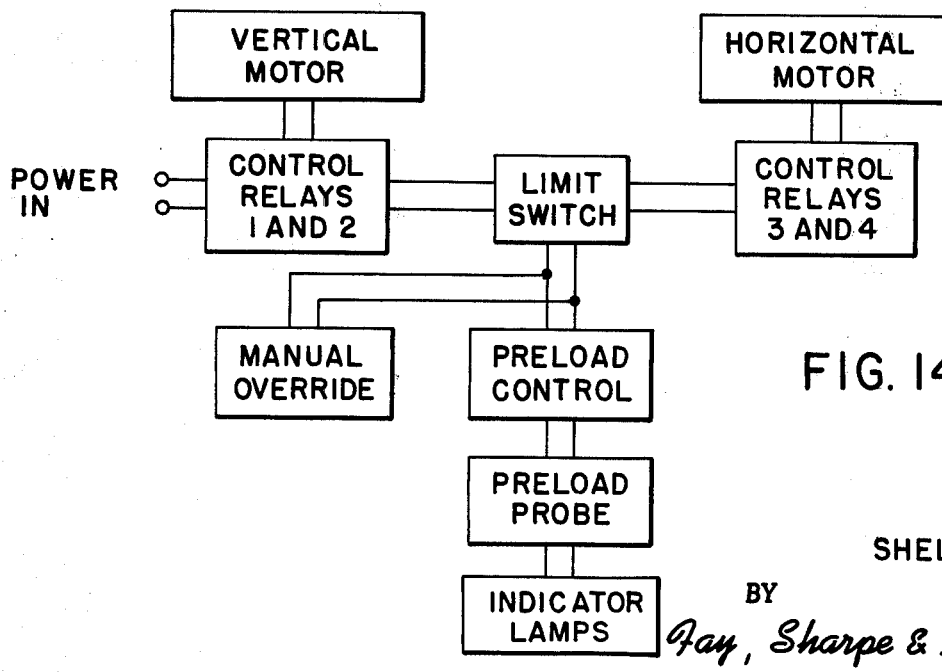

FIG. 14 is a block diagram of the basic unit.

Figure 15:
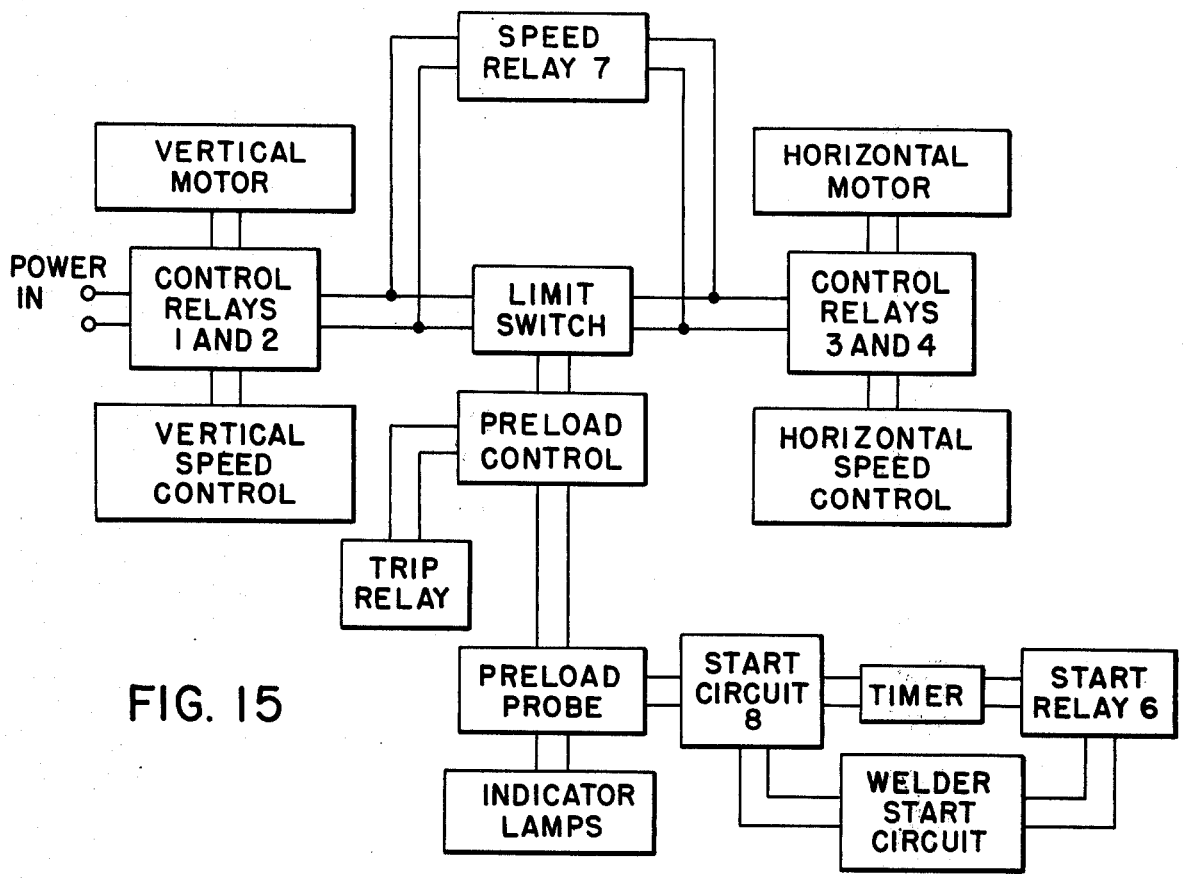

FIG. 15 is a block diagram of one embodiment of this invention having a timing mechanism.

Figure 16:
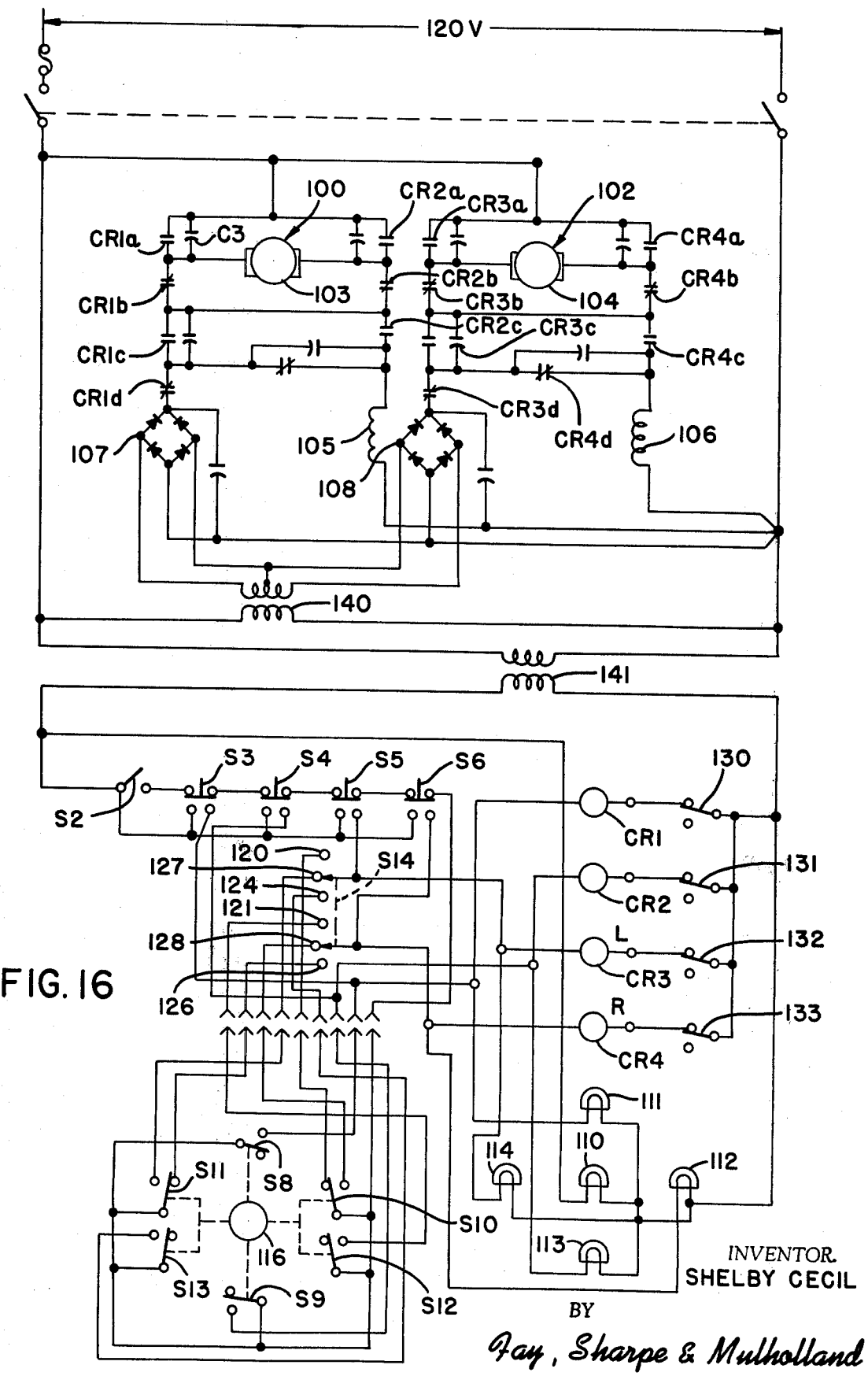

FIG. 16 is a schematic diagram of the basic electrical circuitry of this invention.

Figure 17:
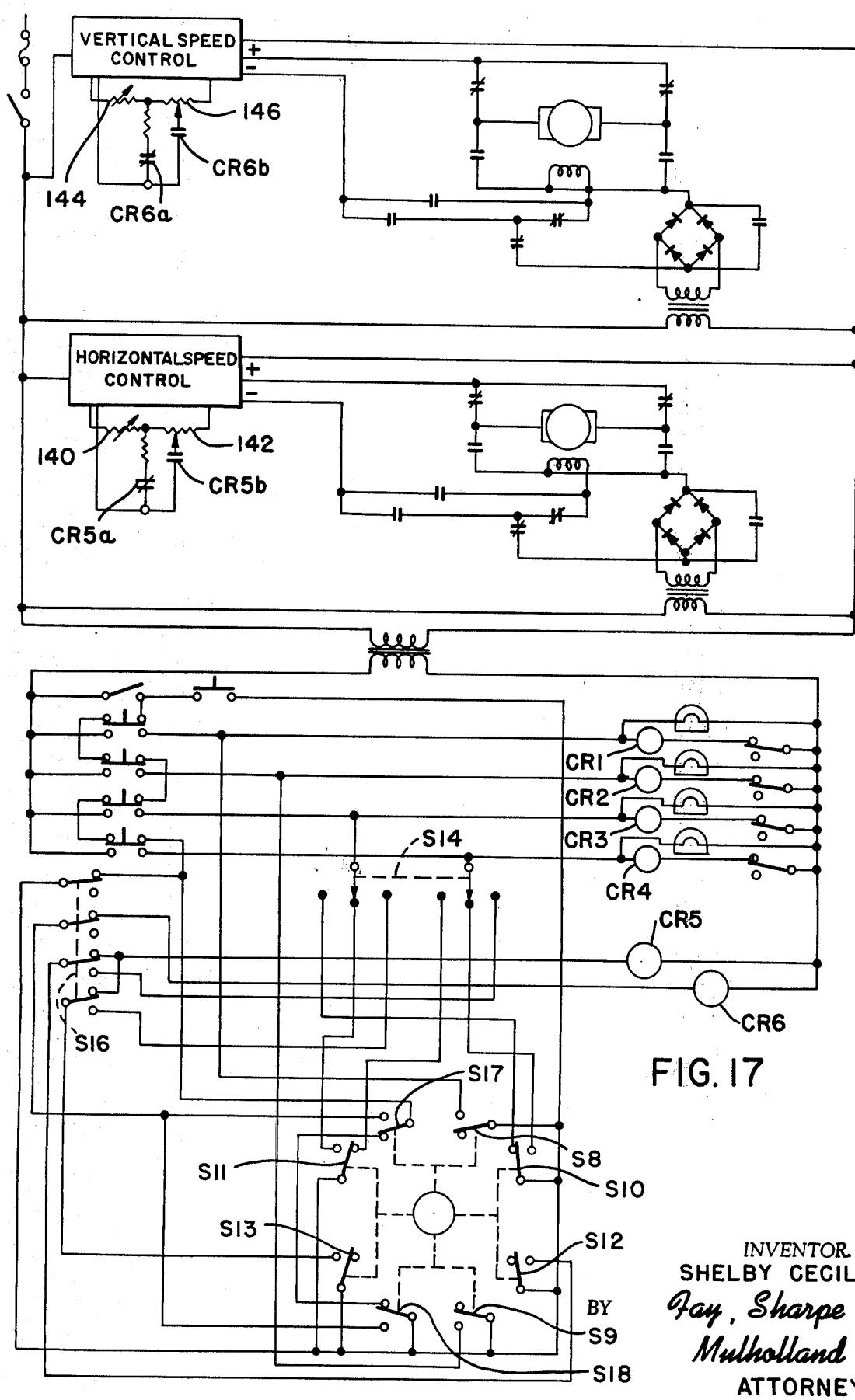

FIG. 17 is a schematic diagram of the circuitry for two-speed probe travel.

Figure 18:
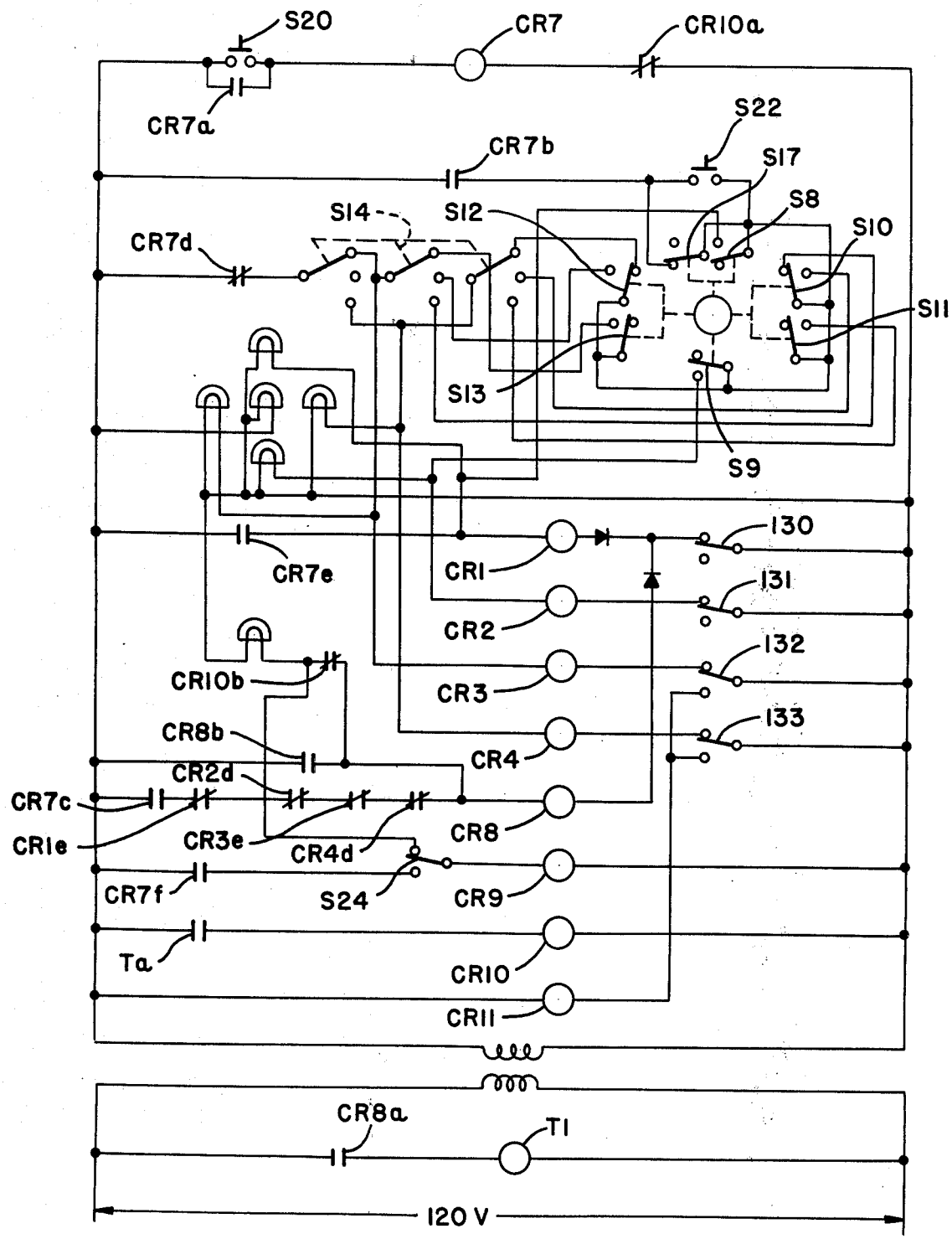

FIG. 18 is a schematic diagram of this invention which utilizes a fully automatic timed unit.

Figure 1:
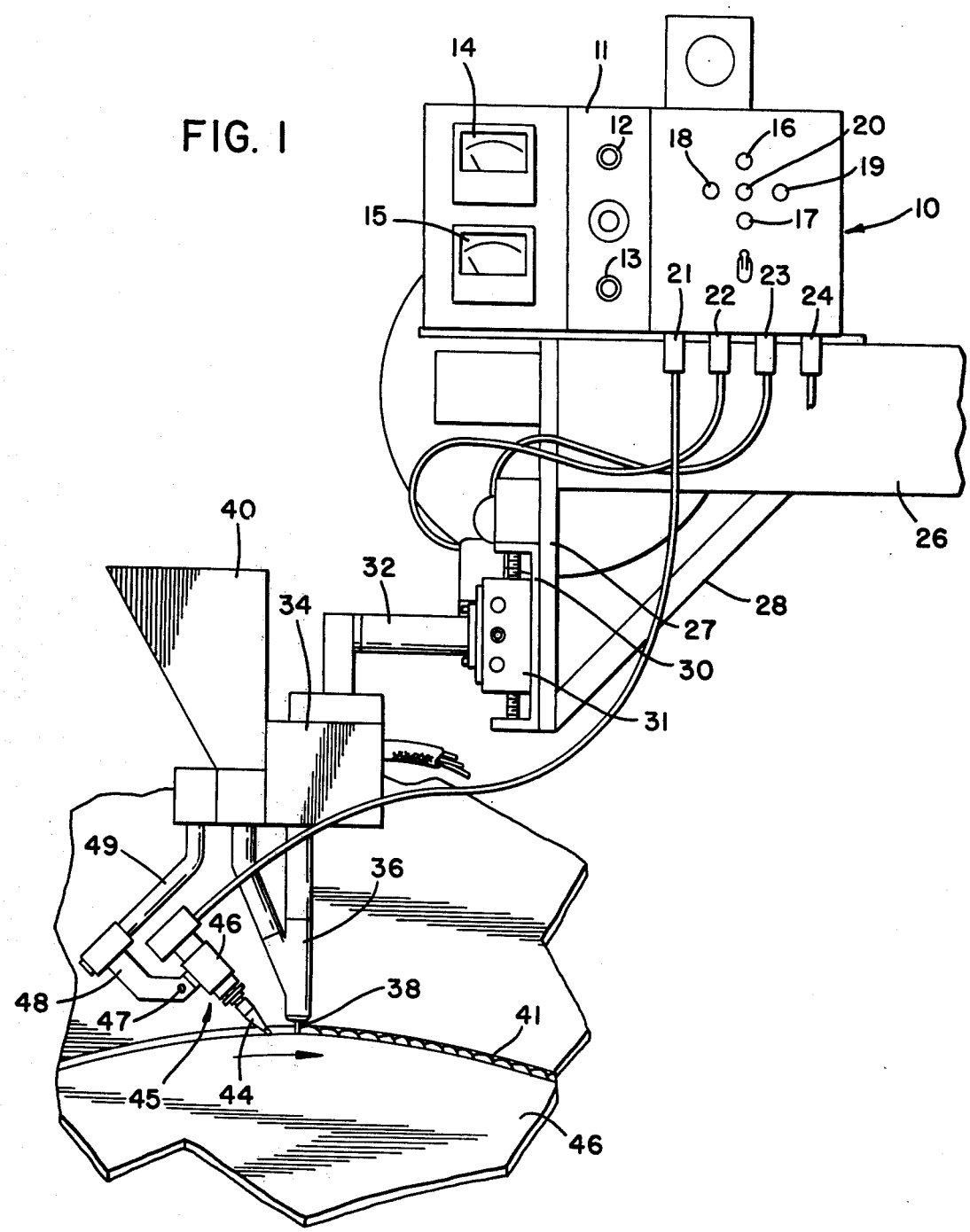
FIG. 1 is a side view of welding apparatus and guidance system.

As illustrated in FIG. 1, this invention is designed to be used on an arc welder 10, having a control panel 11, which has control knobs 12 and 13 for regulating the current and voltage. The voltmeter 14 and ammeter 15 indicate respectively the voltage and current of the arc welder.

Various lights on the control panel indicate the direction in which the unit may be moving. If the unit is moving upwardly, light 16 is lit, whereas if it is moving in the opposite direction, lower light 17 will be illuminated. Similarly, if the unit is moving left, the left light 18 will be lit and if it is moving right, the right light 19 will be on. The center light 20 indicates whether the power is on.

Appropriate outlets 21, 22, 23 and 24 make electrical contact with the different components and contacts in the system as described hereinafter. The entire unit may move horizontally along the beam 26. At one end of the beam 26 is a cross slide 27 which is partially supported on the beam 26 by means of a brace 28.

A cross slide base plate 30 permits the supporting assembly 31 to move vertically. Movement is achieved by appropriate motor given gears.

An outwardly extending arm 32 from the supporting assembly 31 holds the automatic welding head 34 from which the nozzle tip 36 of the automatic arc welder protrudes. A welding wire 38 extends downwardly from below the nozzle tip 36. In addition to the welding wire 38, flux is fed from the flux hopper 40 to the welding zone to provide a seam 41. Assembly 41 moves horizontally and vertically. While a sub-arc welding head is shown in FIG. 1, it should be understood, however, that this guidance system can be used with other welding systems such as mig and tig.

A probe 42 having a probe finger 44 extending from underneath it is supported by a bracket 46 at about a 45° angle and is hingedly connected at 47 to a brace 48. The brace 48 is supported by a rod 49 to the welding head and flux hopper assembly. As noted from FIG. 1, the workpiece 46 is moving to the right so that the guidance system probe 42 actually precedes the tip of the arc welder. Because of the angular position of the probe the probe finger 44 may move vertically and horizontally without moving axially.

THE PROBE

FIGS. 2 through 5 show detailed views of the probe 42. It includes a casing 43 which is generally cylindrical in nature. Within the casing 43 is an actuating rod 44 which extends downwardly concentric with the casing beyond an opening 46 at one end thereof. The actuating rod is connected to a probe finger 48. The probe finger has an opening along its top 49 into which the end 50 of the actuating rod 44 extends. A set screw 52 is threadedly engaged with the probe finger and presses against the actuating rod in order to secure it in position within the probe finger 48.

The probe finger has three distinct areas. The upper area 54 is generally cylindrical in area and extends downwardly to a frusto-conical shaped section 56. A cylindrical tip 58 having a rounded end is connected to the section 56. Other shapes of probe fingers may be used.

The actuating rod 44 is biased to the left as viewed in FIG. 2 by means of a spring 60 held in position by set screw 61. The top of the casing 43 is connected to a housing 62 in which various switches are located. The actuating rod 44 extends upwardly through an aperture 63 in the bottom of the housing 62. An appropriate electrical connector 64 is in communication with the switches therein. The upper part of the actuating rod 44 has a series of projections which make contact with the switches.

Switches 66 and 68 are positioned across from each other on either side of the actuating rod. The switch 66 makes contact with the rod 44 as a result of vertical movement of the probe finger 48. Switch 66 is used to sense downward movement and switch 68 senses upward movement. As noted in FIG. 2, the probe is biased to the left and in contact with the switch 66. Closing with switch 66 causes the circuit, as described in more detail hereinafter, to cause the arc welder and probe to move downwardly until pressure is relieved from the switch 66 due to contact with the workpiece. If the pivot rod 44 should continue to feel upward pressure it would contact switch 68. This would cause the vertical motor to move the slide upwardly until pressure is relieved on switch 68. Horizontal switches 70 and 72 are used to gauge the side-to-side movement of the mounted guide and arc welder.

That is, when the tip 58 of the probe is moved, due to meeting an abutment of some kind, to one side or the other, an electrical contact is closed, an appropriate motor is actuated, and the arc welder is moved until pressure from the abutment is released. Switches 70 and 72 have plungers 73 and 74, respectively. Additional switch 76 having a plunger 77, and switch 78 having a plunger 79 are also positioned in the same manner as the horizontal switches 70 and 72. Switches 76 and 78 are positioned immediately above the horizontal switches 70 and 72. The switches 76 and 78, however, are used in the circuitry to cause the probe to seek an abutment or edge to the left or right of the probe, make contact with it and maintain its position along it, as described below in more detail.

TYPES OF WELD

Figure 6:
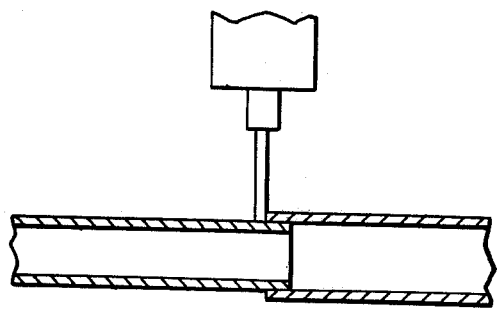
Figure 7:
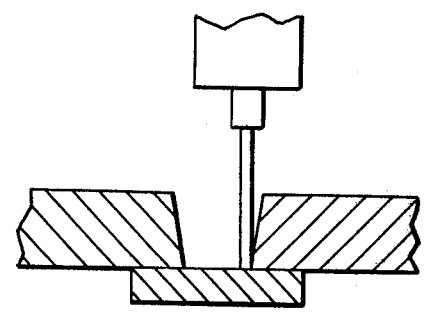

FIGS. 6 through 13 illustrate the various manners in which different probes may be used. FIGS. 6 and 7 illustrate the use of a probe in a preload left biasing position. That is, as discussed above the probe may be programmed to move along the edge of a seam. In the configuration shown in FIGS. 6 and 7 the probe would be preloaded to the right. That is, it would follow the abutment and maintain itself in contact with it. Moreover, as shown in FIG. 7 a longer probe may be used if the depth of a seam requires it.

Figure 8:
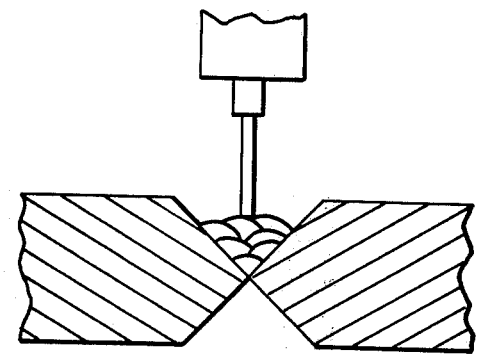
Figure 10:
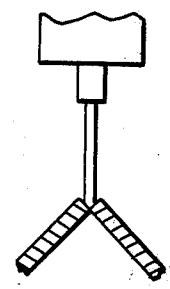

As illustrated in FIG. 8 the probe may be used to make several passes in a V-groove. In this respect, if it were desired to have the probe move along either edge of the V in FIG. 8 it could be preloaded to the left or right. FIG. 10 shows a similar situation where the probe would track through the center of the groove.

Figure 9:
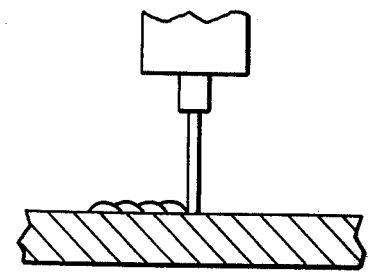
Figure 11:
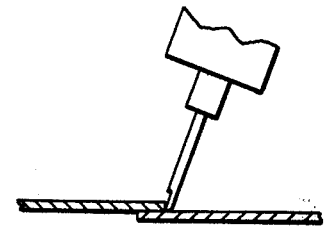

FIGS. 9 and 11 show the type of situation where preload left may be used. That is, where the probe would follow along the edge of an abutment such as FIG. 11 or a seam as in FIG. 9.

Figure 12:
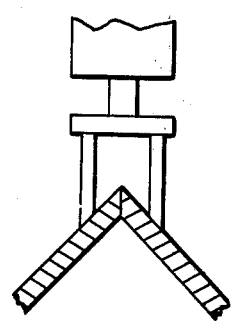

FIG. 12 shows a different type of probe which consists of two downwardly extending spaced apart arms. The arms straddle a ridge which is to be welded. In this manner a bead may be laid along the very spex of the ridge.

Figure 13:
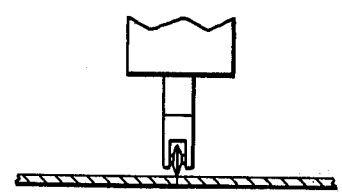

A roller probe as illustrated in FIG. 13 may be used where a very high degree of accuracy is desired for a very small seam. That is, the roller moves along the crack between two abutting pieces of metal. In this way any movement to the left or right of the seam will be immediately detected by the probe.

The actuating rod 44 is allowed to pivot within the casing 43 by means of a pivot plate 80 mounted on a pivot ball 82 on a fixed plate 84. The pivot ball 82 is located in V-shaped grooves 85 and 86. The pivot plate 80 is prohibited from rotating on the fixed plate 84 by a pin 87. The fixed plate 84 is held in position against the casing by means of a set screw 88. An abutment plate 90 is positioned on the lower end of the actuating rod 44 and below the casing 43 in order to prevent any substantial amount of vertical movement within the casing 43.

Switch 72 is positioned immediately beside the actuating rod in the probe and below the switch 78. The switch 72 closes at a later time than switch 78 because the probe moves in an arc and naturally contacts the higher of two vertically placed switches. As a result of this time sequence of closing switches additional functions can be performed by the guidance system as explained hereinafter with reference to FIGS. 16-18.

As utilized, the probe 42 will actually have about a 45° angle from that pictured in FIG. 2. In this manner, vertical movement of the probe finger 56 is transmitted to either the switch 66 or switch 68. Side-to-side or horizontal movement will cause the probe to move and contact the switches 72 or 78.

OPERATION

FIG. 14 is a block diagram of the operation of the basic unit. Power is supplied to motors, control relays and the probe which may be preloaded or biased to move in a given direction. The probe signals the preload controls which relays the signals to control relays one through four to the horizontal or vertical motors. If the limit switches have been opened because of an extreme position of the unit the signals will not be transmitted. For example, if the workpiece should slope downwardly and require that the probe be driven downwardly, control relay 2 will signal the vertical motor to drive the unit downwardly. If, at any time, a vertical limit on the slide is reached, a switch will open the circuit and stop the motor to prevent damage to the slide itself.

If the probe indicates that horizontal motion is required to keep the welding head in the proper position, control relays 3 and 4 will be energized to drive the horizontal slide to the right or left direction. Again, limit switches may stop all motion in order to protect the guidance system and arc welder. If the unit is to proceed to the left, relay 3 is energized; if the unit is to proceed to the right, relay 4 is energized. If the unit is preloaded to the left, relay 3 will automatically sense and drive the unit to the left, until the probe strikes a side of the previous bead, a lap joint or some other obstacle. At this time, relay 3 will open, thus stopping the horizontal motion.

FIG. 15 is a block diagram of a system similar to that shown in FIG. 14. It has, however, an automated starting and stopping system which may be used when welding units where high speed and repeatability is desired. An example of such a unit would be a small tank of some type. The unit is started in operation automatically when the operator places a small part into a welding jig (not shown) and actuates the jig in order to move the workpiece or part. If a preload has been programmed in, the probe will move to the left or right depending on which way the preload is set. When the probe locates the seam, the unit will stabilize itself and the welder and timer will begin. The workpiece is turning at this time. If the workpiece is a tank or some other circular object, the welder will eventually reach its starting point. When the starting bead is reached, the timer will take control away from the probe and stop it, thus preventing it from riding up over the starting bead. When the starting bead is reached with the welding head, the operator stops the welding arc and removes that part from the jig.

Horizontal and vertical speed control permits the probe to move in and out of position at two different speeds. That is, control relays 1 and 2 and control relays 3 and 4 can be utilized to make the unit move at different speeds. In this manner, the guidance system will make the arc welder head move to and away from the workpiece relatively fast when the distance to be travelled is great. The unit is programmed to move slowly when it is nearer its welding position.

CIRCUITRY

FIG. 16 shows the basic circuitry used in the guidance system of this invention. The horizontal and vertical sections of the circuitry are identical in all respects except with the direction in which they drive the probe. A 120 volt source actuates a vertical motor 100 and a horizontal motor 102 having armatures 103 and 104 respectively. The motor field windings 105 and 106 are used with the armatures 103 and 104 respectively. The field windings 105 and 106 have bridges 107 and 108 respectively across them which converts the alternating current to a full wave direct current and acts as a constant voltage source for the motor field windings for the purpose of dynamic braking. Dynamic braking of the motor armature is necessary in this guidance system and invention in order to prevent the electric arc and probe from over-correcting due to coasting of the motor after power to it has ceased. In order to obtain dynamic braking at all times, including the period when no signals are being transmitted to the motor the motor field windings are impressed with a constant voltage from the bridges. The D.C. voltage is directed to establish a counter emf which acts to stop the rotation of the armature. There is a distinct advantage in this system over normal dynamic braking which simply shorts the armature. In the usual system the voltage across the field winding decreases as the motor slows down. This invention, however, provides a constant voltage across the field winding the thus provides the maximum braking forces on the armature.

Control relay switches CR 1 through CR 4 correspond to the electromagnetic coils CR 1 through CR 4 respectively. That is, when any one of the coils is actuated the switches with the same notation are changed from the positions shown in FIG. 16. For example, if coil CR 1 were energized all the normally closed switches CR 1 would open and all the normally open switches CR 1 would close.

Manual override switches S 3, S 4, S 5 and S 6 are used to override the signals from the probe and move the guidance system up, down, left or right. Any one of these switches cut out the probe circuitry and immediately activate one of the control relay coils thus causing a motor to move the entire unit. Switch S 2 is a switch which must be closed to provide power to the entire probe unit. Control relays CR 1, CR 2, CR 3 and CR 4 when actuated, respectively, drive the probe and arc up, down, left and right. Lights indicated as 110, 111, 112, 113 and 114 are used to indicate the direction in which the unit is moving. Light 110 simply indicates that the power is on. The rest of the lights are positioned around the light 110 and indicate, respectively, in numerical order whether the unit is moving up, down, left or right.

Switches S 8 and S 9 are located on the probe and when closed cause the vertical motor to move the unit up or down.

Two separate switches are provided for movement in the horizontal plane. Switches S 10 and S 11 are positioned across from each other on either side of the actuating rod 116 in the probe. Switches S 10 and S 11 cause the welding unit to move to the right or left, respectively, when there is no bias or preload programmed into the circuit.

Switches S 10 and S 11 may also function to bias the probe to the right or left. This bias or preload condition is used when it is desired to have the probe seek an abutment or seam and weld along it. A left preload condition is programmed into the probe by moving the switch S 14 to the upper contact 120 and 121. When in this position the current flows through switches S 2 to S 6 into the common line for switches S 8 through S 13. All of the switches except S 10, however, lead to an open circuit. Switch S 10 completes a circuit through contact 120 to the control relay coil CR 3. Activation of the coil CR 3 closes normally opened switches CR 3a and CR 3c and opens normally closed switches CR 3b and CR 3d. This configuration of switches allows current to pass through now closed switch CR 3a, through the motor armature from left to right, through normally closed switch CR 4b, through the now closed contact CR 3c, through normally closed switch CR 4d and through the motor field 106. The positions of the switches CR 3 and CR 4 permit current to flow to the coil winding 106. More specifically, the current flows through now closed switch CR 3a through the motor 104 from left to right through the normally closed switch CR 4b through now closed control relay CR 3c through the normally closed switch CR 4d and through the field winding 106. Since everything is actuated the motor therefore drives the probe and welding unit to the left.

The probe and arc welder will continue to move to the left until the probe finger engages an abutment. At this point, it would pivot and actuate switch S 10 thus opening the circuit and stopping the motor.

When switch S 14 is in the preload left condition, switch S 11 merely goes to an open circuit in either of its positions and therefore is not relevant. Switch S 13 is also out of the circuit in a preload left condition. Switch S 12 leads to contact 121 which is contacted by switch S 14 in a preload left condition. Should the probe not feel the pressure of the abutment the switch S 10 will go to its original position to the left as shown in FIG. 16 and actuate the horizontal motor as explained above. The probe will then move to the left until it reaches the seam. If the seam should move to the right, switch S 12 will be closed. This completes a circuit through contact 121 and activates control relay coil CR 4. Control relays CR 4a and CR 4c will thus close and normally closed relays CR 4b and CR 4d will open. This will thus cause the motor to drive the probe to the right.

Still referring to FIG. 16, the probe can be preloaded to the right by moving switch S 14 to contacts 124 and 126. In this manner only switch S 11 would complete a circuit without any pressure on the probe and would drive the probe to the right until it met an abutment which would change the position of switch S 11. At this time, switch S 13 would then act as a signalling switch to drive the probe to the left when that is necessary.

Switches S 8 and S 9 are closed by movement of the probe in the vertical direction. For example, if the probe engages a rising surface, it will close switch S 8, which activates control relay coil CR 1. Normally open control relay switches CR 1a and CR 1c will close and normally closed control relay switches CR 1b and CR 1d will open. The motor 100 will thereby drive the unit upwardly until the pressure is relieved from the probe. It should be understood that switches S 10, S 12 and S 13 in FIG. 16 correspond to switches 78, 76, 72 and 70 respectively in FIG. 3.

When there is a no preload condition; that is, when the switch S 14 is in contact with contacts 127 and 128 the switches S 12 and S 13 are removed from the circuit and have no effect thereon regardless of their relative positions. At this time switches S 10 and S 11 govern the horizontal movement. That is, the probe would move in a straight line until it met horizontal obstacle. It would then move and change the position of switch S 10 or S 11. As explained earlier either control relay CR 3 or CR 4 would be activated and cause motor 102 to move the unit to the left or right.

Switches 130, 131, 132 and 133 are simply limit switches and are placed at the end of the horizontal and vertical slides on which the unit travels in order to prohibit any excessive motion and therefore any damage. That is, once the guidance system has moved to its extreme position the limit switch will automatically open and cause the entire unit to stop.

The lights 111 through 114 are simply connected into the circuit for the coils in the control relays and indicate the direction in which the unit is being driven at that time. Light 110 is connected directly into the power source and simply indicates that power is being supplied to the entire unit.

It should also be noted that the probe is normally biased in a downwardly direction. This is done so that the probe will stay in contact with the workpiece.

The reason that stepdown transformers 140 and 141 are used in the circuit is to reduce the voltage to the probe. This greatly reduces the possibility of serious shock to anyone if a short should occur in the probe.

FIG. 17 shows substantially the same circuitry shown in FIG. 16, except that it contains one additional feature. A two speed control for both the vertical and horizontal motors are included with the circuitry. Since the circuit is substantially the same as that described above, the details of the probe circuitry and control relay for moving the vertical motors will not be discussed. The circuitry of FIG. 17 include the use of a four-way switch S 16. In the position shown in FIG. 17 it is positioned to eliminate the preload function of the probe and replace it with speed control. Again, there are two sets of horizontal switches in FIG. 17 shown as S 10, S 11, S 12 and S 13. Switch S 12 is positioned immediately below S 10 on the probe and as mentioned earlier will be actuated at a slightly later time because it is nearer the pivot point than S 10. Moreover, the position of switch S 12 may be adjusted along the horizontal plane by means of a set screw which is provided in the probe. When the probe abuts against an obstacle to left or if the seam goes to the left it will move the switch S 10. When this occurs, the coil of control relay 4 will be activated thus changing all of the switches CR 4, moving the horizontal speed control motor to motivate the probe to the right. However, should the probe be moved further to the right than its earlier position, switch S 12 will also be closed thus activating control relay CR 5 and opening normally closed switches CR 5a and closing normally opened switches CR 5b. In this manner, the low speed adjustment 140 will be effectively removed from the circuit and the high speed adjustment 142 will be placed in the circuit.

As the probe moves back to its neutral position quickly switch S 12 is moved before S 10. At this point, control relay CR 5 and its switches will revert to their original positions and the low speed adjustment 140 will come back into effect. The probe will slow down but continue its movement until it reaches its unbiased or satisfied position. Thereupon, S 10 will also move back to its normal position and the probe and arc welder will move along its predetermined path.

Additional switches S 17 and S 18 are provided for high speed motion in the vertical direction. Accordingly, control relay coil CR 6 and control relay switches CR 6a and CR 6b with low speed adjustment 144 and high speed adjustment 146 operate in the same fashion as that described above.

FIG. 18 again depicts basically the same type of circuitry illustrated in FIG. 16. However, FIG. 17 includes a system which makes the probe movement completely automatic. This type of unit is particularly useful when a series of items which are identical are being welded. An example of such an item might be a rim or bowl which has to have a seam welded around its circumference. In this situation, each piece is generally the same size and takes the same amount of time to weld. Accordingly, a timer is provided which gauges the amount of time of welding and stops once that time has elapsed. Moreover, once the time has elapsed, the probe move to a predetermined position away from the workpiece. When a new workpiece is placed in position and a signal is given by means of a single switch, the probe will automatically go to the correct position, guide itself along the seam while leading the welding head, complete the weld and retract to its original position.

The motor circuitry is not shown in this figure but it is identical to that discussed above. To start the operation, control relay coil CR 7 is energized when switch S 20 is depressed. Normally open contacts or switch CR 7a closes, locking in control relay coil CR 7 and allowing switch S 20 to be released.

Due to the spring pressure of springs 60 and 89, FIG. 2, the probe is always preloaded down. The preload switch S 14 is set to right preload and when normally open contact CR 7b closes it supplies power to switches S 8 through S 13 through a normally closed contact of switch S 17.

The welding head and probe will move down and right until the workpiece is found. The speed controls should be set so that the probe will touch the workpiece and stop the downward motion before the horizontal motion. When the probe touches the workpiece the head and probe will continue to the right until it finds the seam. When the seam is found all motion will stop and control relays CR 1, CR 2, CR 3 and CR 4 will deenergize. Normally open switch CR 7c is closed and the circuit is completed through switch CR 7c, CR 1e, CR 2d, CR 3e and CR 4d to energize control relay coil CR 8. When coil CR 8 is energized, normally open switch or contact CR 8b is closed and holds control relay coil CR 8 in. Normally open switch or contact CR 8a closes and energizes the timer T 1. A normally open contact of control relay coil CR 8 also closes and starts the welder.

When the starting bead is reached switch S 17 located in the probe below the normal up switch S 8 will actuate due to the abrupt change in height. Switch S 17 is positioned physically within the probe so it is only sensitive to abrupt changes. This opens the path of power to the probe and prevents the welding head from lifting before the weld is complete. When the weld has been completed the timer T 1 will have timed out. When the timer T 1 is timed out, switch T-a closes and energizes control relay coil CR 10. When the control relay coil CR 10 is energized normally closed contact or switch CR 10b opens and stops the welder. Normally closed contact or switch CR 10a and de-energizes control relay coil CR 7. When control relay coil CR 7 is de-energized the normally open switch CR 7b opens removing control of the probe, normally closed switch CR 7e closes and energizes control relay coil CR 1 which drives the welding head and probe up. Normally closed switch CR 7d closes and through a third section of the preload switch S 14 drives the welding head to the left in this case or opposite the direction of the preload. When the slide hits this up limit switch 130, control relay coil CR 8 will de-energize. When control relay coil CR 8 is de-energized the switch CR 8a will open resetting the timer T 1. If, while welding, one of the horizontal limit switches 132 or 133 are actuated control relay coil CR 11 will energize which will cut of the welder.

Control relay coil CR 9 is used in conjunction with a rapid traverse system. Switch S 24 selects either high speed movement to and from the workpiece or away from the work only.

Switch S 22 is used to bypass switch S 17 and return power to the probe in cases where the cut-off circuit is not wanted.

The invention claimed is:

1. A guidance system for a welder having a welding head comprising;
    a probe;
    said probe including an actuating rod movably mounted therein;
    means for movably mounting the probe in the vicinity of the welding head;
    first switching means for sensing movement of actuating rod and transmitting a signal to the guidance system, wherein said first switching means includes at least one switch which is positioned near the actuating rod in the probe in a first plane generally perpendicular to the workpiece in order to signal vertical changes in the workpiece which are sensed by the probe;
    a motor operatively attached to the probe and the welding head, wherein said motor has a field coil and circuit means for supplying a constant voltage to the field winding while short circuiting its armature in order to provide dynamic braking;
    circuit means for actuating the motor in response to signals from the probe; and
    second switching means for biasing the movment of the probe, wherein said second switching means includes switches around the actuating rod and circuit means for driving the motor which moves the probe until pressure on the probe changes the position of switches in the probe and stops the motor.

2. The guidance system of claim 1 wherein said first circuit means for actuating the motor includes a timer and switch to stop the guidance system after a predetermined time and circuitry to start the welder when the probe is in position; the first circuit means acting with the first and second switching means for biasing in order to create a unit which when actuated will seek the workpiece, find it, start the welder, weld a workpiece, and shut itself off after a predetermined time.

3. A guidance system for a welder having a welding head comprising:
    a probe;
    an actuating rod moveably mounted in the probe;

means for mounting the probe at an angle with respect to the workpiece in the vicinity of the welding head;

first switching means in the probe for sensing horizontal and vertical movement of the actuating rod;

a motor for actuating and moving the probe and the welding head;

circuit means for actuating the motor in response to signals from the probe;

a second switching means for sensing horizontal and vertical movements of the probe of dimensions greater than movements greater than those sensed by said first switching means for sensing; and means for controlling the speed of the motor in response to signals from said first and second switching means.

4. The guidance system for claim 3 wherein said second switching means for sensing includes a set of switches for sensing horizontal and vertical movement of actuating rod positioned below said first switching means and the means for controlling the speed of the motor includes voltage speed controls actuated by said first and second switching means and appropriate control relays for sensing and sending signals to the speed controls.

* * * * *